(12) United States Patent
Niu et al.

(10) Patent No.: US 11,314,110 B2
(45) Date of Patent: Apr. 26, 2022

(54) LIQUID CRYSTAL DISPLAY AND DRIVING METHOD THEREOF

(71) Applicant: BOE TECHNOLOGY GROUP CO., LTD., Beijing (CN)

(72) Inventors: Xiaochen Niu, Beijing (CN); Xue Dong, Beijing (CN); Xiaochuan Chen, Beijing (CN); Wenqing Zhao, Beijing (CN); Haiyan Wang, Beijing (CN); Chenyu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 857 days.

(21) Appl. No.: 16/076,046

(22) PCT Filed: Nov. 22, 2017

(86) PCT No.: PCT/CN2017/112321
§ 371 (c)(1),
(2) Date: Aug. 7, 2018

(87) PCT Pub. No.: WO2018/130009
PCT Pub. Date: Jul. 19, 2018

(65) Prior Publication Data
US 2021/0191175 A1 Jun. 24, 2021

(30) Foreign Application Priority Data
Jan. 13, 2017 (CN) .......................... 201710025917.0

(51) Int. Cl.
*G09G 3/36* (2006.01)
*G02F 1/133* (2006.01)
(Continued)

(52) U.S. Cl.
CPC .......... *G02F 1/13306* (2013.01); *G02F 1/137* (2013.01); *G02F 1/1337* (2013.01);
(Continued)

(58) Field of Classification Search
CPC ......... G02F 1/134363; G02F 1/133526; G02F 1/1337; G02F 1/133514; G02F 1/133512;
(Continued)

(56) References Cited

U.S. PATENT DOCUMENTS

2012/0293503 A1 11/2012 Miyazawa et al.
2013/0286342 A1* 10/2013 Momonoi ................. G02F 1/29
349/139

(Continued)

FOREIGN PATENT DOCUMENTS

CN 102809865 A 12/2012
CN 103376602 A 10/2013
(Continued)

OTHER PUBLICATIONS

Decision of Rejection for Chinese Patent Application No. 201710025917.0 dated Mar. 30, 2018.
(Continued)

*Primary Examiner* — Pegeman Karimi
(74) *Attorney, Agent, or Firm* — Calfee, Halter & Griswold LLP

(57) ABSTRACT

Embodiments of the present disclosure provide a liquid crystal display and a driving method thereof. In the liquid crystal display, orthographic projections of each of the light shielding structures and a corresponding light source on the lower substrate overlap. Light emitted from each of the light sources is incident into the liquid crystal layer in a collimated manner, and the first electrode and the second electrode are configured to form an electric field in response to voltages applied to the first electrode and the second electrode, so that liquid crystal molecules within an area of the electric field are deflected to form a convex lens structure.

18 Claims, 6 Drawing Sheets

(51) Int. Cl.
  *G02F 1/1335* (2006.01)
  *G02F 1/13357* (2006.01)
  *G02F 1/1337* (2006.01)
  *G02F 1/1343* (2006.01)
  *G02F 1/137* (2006.01)

(52) U.S. Cl.
  CPC .... *G02F 1/13439* (2013.01); *G02F 1/133512* (2013.01); *G02F 1/133514* (2013.01); *G02F 1/133617* (2013.01); *G02F 1/134309* (2013.01); *G09G 3/3607* (2013.01); *G02F 2203/30* (2013.01); *G09G 2330/021* (2013.01)

(58) Field of Classification Search
  CPC .......... G02F 1/133602; G02F 1/13452; G02F 1/133317; G02F 2001/133317; G02F 1/133615; G02F 1/136209; G09G 3/3607; G02B 6/0053; H01J 11/44; H01J 2211/444; H01J 2329/323; H01J 29/327
  See application file for complete search history.

(56) References Cited

U.S. PATENT DOCUMENTS

| | | | | |
|---|---|---|---|---|
| 2014/0233101 | A1* | 8/2014 | Takagi | G02F 1/29 359/463 |
| 2016/0085082 | A1 | 3/2016 | Liao et al. | |
| 2016/0085118 | A1* | 3/2016 | Lee | G02F 1/29 349/62 |

FOREIGN PATENT DOCUMENTS

| | | |
|---|---|---|
| CN | 103543552 A | 1/2014 |
| CN | 104252083 A | 12/2014 |
| CN | 104730763 A | 6/2015 |
| CN | 104849945 A | 8/2015 |
| CN | 106526993 A | 3/2017 |
| CN | 106847208 A | 6/2017 |
| JP | 09166701 A | 6/1997 |
| JP | 2016075797 A | 5/2016 |
| KR | 20160050423 A | 5/2016 |

OTHER PUBLICATIONS

Search Report of CN201710025917.0 dated May 9, 2017.
First Office Action for Chinese Patent Application No. 201710025917.0 dated Jun. 29, 2017.
Second Office Action for Chinese Patent Application No. 201710025917.0 dated Sep. 12, 2017.
Third Office Action for Chinese Patent Application No. 201710025917.0 dated Dec. 15, 2017.
Search Report and Written Opinion for International Application No. PCT/CN/2017/112321 dated Feb. 26, 2018.

* cited by examiner

LIQUID CRYSTAL DISPLAY AND DRIVING METHOD THEREOF

RELATED APPLICATION

The present application is the U.S. national phase entry of PCT/CN2017/112321, with an international filing date of Nov. 22, 2017, which claims the benefit of Chinese Patent Application No. 201710025917.0, filed on Jan. 13, 2017, the entire disclosures of which are incorporated herein by reference.

FIELD

The present disclosure relates to the field of liquid crystal display technologies, and particularly to a liquid crystal display and a driving method thereof.

BACKGROUND

With the rapid development of display technologies, people have higher and higher requirements on display devices. Being thin, light and energy-saving are always the development goals of display devices.

The display principle of an existing liquid crystal display panel can be summarized as follows: natural light is converted into linearly polarized light by a polarizer on an array substrate, and voltages are applied to a pixel electrode and a common electrode so that an electric field is formed on both sides of a liquid crystal layer. Liquid crystal molecules in the liquid crystal layer rotate under the effect of the electric field, thereby changing the polarization state of the linearly polarized light. A polarizer on a color filter substrate analyzes the linearly polarized light. By controlling the magnitude of the electric field, the polarization state of the light can be controlled, and the difference in the polarization state means that the brightness of the light analyzed from the polarizer on the color filter substrate is different, thereby achieving grayscale display of an image.

However, a stacked structure of the upper and lower polarizers in the existing liquid crystal display structure increases the thickness of the liquid crystal display device, which is contrary to the trend of making the liquid crystal display lighter and thinner. In addition, the use of polarizers causes at least 50% of light energy to be lost. As a result, the requirement on the brightness of the liquid crystal display device can only be satisfied by increasing the luminance of a backlight, which undoubtedly increases the power consumption of the liquid crystal display device.

SUMMARY

The present disclosure provides an improved liquid crystal display and a driving method thereof, which can at least partially alleviate or even eliminate the above-mentioned disadvantages of the prior art.

An aspect of the present disclosure provides a liquid crystal display comprising a backlight source including a plurality of light sources; a lower substrate on a light exit side of the backlight source; an upper substrate disposed opposite to the lower substrate; a liquid crystal layer between the upper substrate and the lower substrate; a first electrode on a side of the upper substrate facing the liquid crystal layer and a second electrode on a side of the lower substrate facing the liquid crystal layer; and light shielding structures in one-to-one correspondence with the plurality of light sources, orthographic projections of each of the light shielding structures and a corresponding light source on the lower substrate overlapping. Light emitted from each of the light sources is incident into the liquid crystal layer in a collimated manner, and the first electrode and the second electrode are configured to form an electric field in response to voltages applied to the first electrode and the second electrode, so that liquid crystal molecules within an area of the electric field are deflected to form a convex lens structure.

In some embodiments, the liquid crystal display further comprises a control unit configured to adjust a voltage difference between the first electrode and the second electrode so as to adjust a curvature of the lens structure.

In some embodiments, the larger the curvature of the lens structure is, the larger an exit angle of light exiting from the lens structure will be.

In some embodiments, the larger the voltage difference between the first electrode and the second electrode is, the larger the curvature of the lens structure will be.

In some embodiments, the larger an equivalent optical path length of the lens structure in a cell thickness direction of the liquid crystal display is, the larger an effective refractive index of the lens structure will be.

In some embodiments, the liquid crystal display comprises a plurality of sub-pixels arranged in an array, the plurality of sub-pixels are in one-to-one correspondence with lens structures, and the lens structures are in one-to-one correspondence with the plurality of light sources.

In some embodiments, the first electrode is a planar electrode, and the second electrode includes a plurality of electrode units.

In some embodiments, the second electrode is a planar electrode, and the first electrode includes a plurality of electrode units.

In some embodiments, the electrode units are arranged in an array.

In some embodiments, a distance between adjacent electrode units is less than or equal to 3 um.

In some embodiments, each electrode unit is a block electrode.

In some embodiments, each electrode unit is of an annular structure.

In some embodiments, each lens structure is a spherical structure, and a light shielding structure is aligned with a central position of a corresponding spherical structure.

In some embodiments, each light shielding structure is a circular structure.

In some embodiments, the light shielding structures are located between the first electrode and the upper substrate.

In some embodiments, the liquid crystal display further comprises a first alignment film between the light shielding structures and the liquid crystal layer; and a second alignment film between the liquid crystal layer and the second electrode.

In some embodiments, the liquid crystal display further comprises a photochromic conversion layer, wherein the photochromic conversion layer is located on a side of the upper substrate facing the first electrode, and is configured to convert light transmitted through the liquid crystal layer and corresponding to the lens structure into monochromatic light.

In some embodiments, the liquid crystal display further comprises a photochromic conversion layer, wherein the photochromic conversion layer is located on a side of the lower substrate facing the second electrode, and is configured to convert light emitted by the backlight source and corresponding to the lens structure into monochromatic light.

In some embodiments, the photochromic conversion layer includes one of a light splitting film and a color filter film.

Another aspect of the present disclosure provides a method for driving any of the liquid crystal displays described above. The method comprises: receiving a to-be-displayed image signal; controlling voltages applied to the first electrode and the second electrode according to a to-be-displayed grayscale value of each sub-pixel in the to-be-displayed image signal, so as to control the curvature of the convex lens structure.

DETAILED DESCRIPTION

Figure 1:
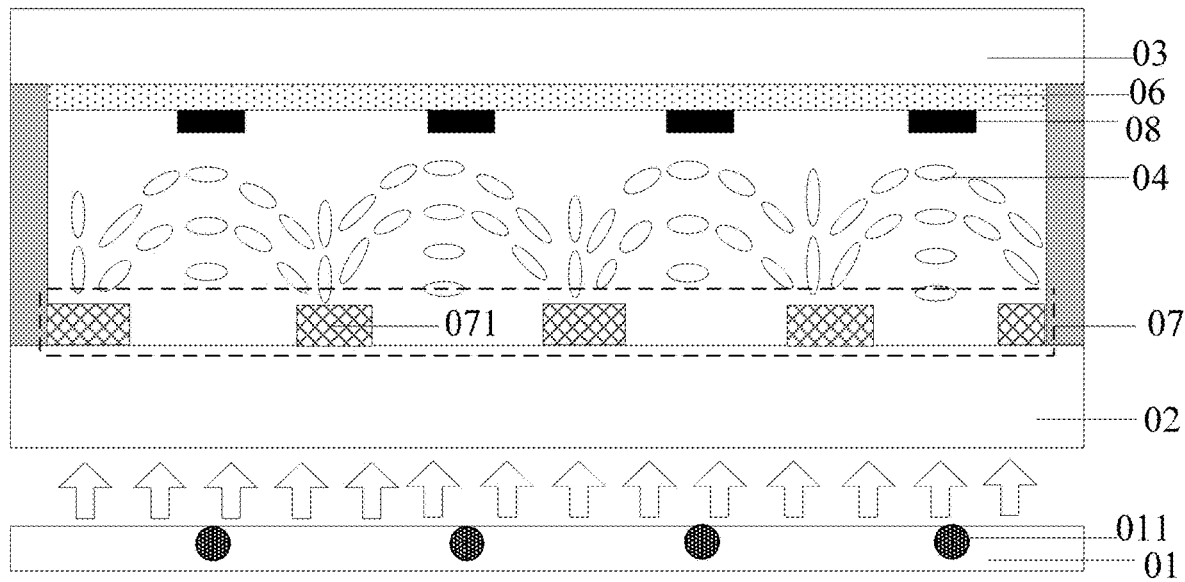
FIG. 1 is a schematic structural diagram of a liquid crystal display provided by embodiments of the present disclosure.

To make the objective, technical solutions, and advantages of the present disclosure clearer, embodiments of the present disclosure will be further described in detail below with reference to the accompanying drawings. Obviously, the described embodiments are merely a part of the embodiments of the present disclosure, but not all of them. All other embodiments obtained by those ordinarily skilled in the art based on the embodiments of the present disclosure without spending inventive efforts shall fall within the protection scope of the present disclosure.

Embodiments of the present disclosure provide a liquid crystal display and a driving method thereof, which are configured for reducing use of a polarizer in a conventional liquid crystal display, thereby achieving the purpose of making a liquid crystal display device lighter, thinner, and energy-saving.

It is to be noted that the shapes and sizes of the components in the drawings are not drawn true to scale and are only intended to schematically illustrate the embodiments of the present disclosure.

Embodiments of the present disclosure provide a liquid crystal display comprising, as shown in FIG. 1, a backlight source 01, a lower substrate 02 on a light exit side of the backlight source 01, and an upper substrate 03 disposed opposite to the lower substrate 02, and a liquid crystal layer 04 between the upper substrate 03 and the lower substrate 02. The backlight source 01 includes a plurality of light sources 011, and light emitted from iii each light source 011 is incident into the liquid crystal layer 04 in a collimated manner.

The light source 011 may be a collimated light source, including but not limited to a laser light source. Light emitted from a collimated light source can basically be regarded as collimated light. Of course, the light source 011 may also include a combination of a light emitting device and an optical element (for example, a polarizer) so as to emit collimated light. No limitation is imposed on the specific form of the light source in the present invention.

Further, as shown in FIG. 1, the liquid crystal display further comprises a first electrode 06 on a side of the upper substrate 03 facing the liquid crystal layer 04 and a second electrode 07 on a side of the lower substrate 02 facing the liquid crystal layer 04, and a control unit (not shown in the figure) configured to adjust a voltage difference between the first electrode 06 and the second electrode 07. In particular, the first electrode 06 is a planar electrode, and the second electrode 07 includes a plurality of electrode units 071.

The liquid crystal display further comprises light shielding structures 08 in one-to-one correspondence with the light sources 011 of the backlight source 01, and an orthographic projection of each light source 011 of the backlight source 01 and an orthographic projection of a corresponding light shielding structure 08 on the lower substrate 02 overlap.

When the liquid crystal display performs display, the first electrode 06 and each electrode unit 071 are configured to receive different voltages during the operation of the liquid crystal display to form an electric field, so that liquid crystal molecules within the electric field area are deflected to form a convex lens structure. Correspondingly, the control unit is configured to adjust a voltage difference between the first electrode 06 and each electrode unit 071 so as to adjust the curvature of the convex lens structure formed by the liquid crystal molecules within the electric field area.

The light shielding structures in embodiments of the present disclosure may be disposed between the liquid crystal layer and the upper substrate, or disposed between the liquid crystal layer and the lower substrate, which is not specifically limited herein. FIG. 1 is based on an example in which the light shielding structure 08 is disposed between the first electrode 06 and the liquid crystal layer 04, but embodiments of the present disclosure are not limited thereto.

In embodiments, in order to realize an all-black mode in grayscale display, the light shielding structures in embodiments of the present disclosure are in one-to-one correspondence with the light sources in the backlight source, and configured to block light emitted by corresponding light sources in the backlight source, thereby realizing the all-black mode. Specifically, when the liquid crystal molecules in the liquid crystal display are negative liquid crystals, in an initial state, long axes of the liquid crystal molecules are parallel to the upper substrate and/or the lower substrate, and there is no potential difference between the first electrode and each electrode unit, so the liquid crystal molecules in the liquid crystal layer are not deflected, and no lens structure is formed in the liquid crystal layer. In this case, light beams emitted by the light sources in the backlight source are directly incident onto the light shielding structures, and the all-black mode is realized due to the shielding of the light shielding structures. When the liquid crystal molecules in the liquid crystal display are positive liquid crystals, in an initial state, long axes of the liquid crystal molecules are perpendicular to the upper substrate and/or the lower substrate, and the initial state of the liquid crystal display is a normally white mode. In order to realize the all-black mode of the liquid crystal display, a voltage difference is formed between the first electrode and each electrode unit, so that the liquid crystal molecules in corresponding areas are deflected, and the long axes of the liquid crystal molecules are parallel to the vertical electric field lines between the first electrode and each electrode unit. At that time, the collimated light emitted by the light sources is refracted by the lens structures and then incident onto the light shielding structures, thereby realizing the all-black mode due to the shielding of the light shielding structures.

When the liquid crystal display provided by embodiments of the present disclosure performs display, the electric field between the first electrode and each electrode unit can control the liquid crystal molecules in corresponding areas in the liquid crystal layer to be deflected to form a convex lens structure. The control unit may adjust the voltage difference between the first electrode and each electrode unit to control the curvature of the lens structure formed by the liquid crystal molecules. Therefore, in embodiments of the present disclosure, a convex lens structure is formed in the liquid crystal layer under the effect of the voltage difference between the first electrode and each electrode unit. By means of the refraction effect of the lens structure, the collimated light emitted from the light exit side of the backlight source is refracted to different degrees. A part of the light refracted to different degrees is shielded by the light shielding structure, and a part of the light is not shielded by the light shielding structure and exits from the light exit surface of the liquid crystal display. By adjusting the voltage difference between the first electrode and a corresponding electrode unit in each area, the degree of deflection of the liquid crystal molecules in this area can be adjusted so as to adjust the curvature of the lens structure formed by the liquid crystal molecules in this area, thereby adjusting the degree of refraction of the collimated light emitted from a corresponding light source in the backlight source after passing through the liquid crystal layer, i.e. adjusting the ratio of the light shielded by a corresponding light shielding structure. By adjusting the ratio of the light shielded by each light shielding structure, the brightness of each display area of the liquid crystal display can be adjusted to achieve grayscale display. It is to be noted that, since the collimated light emitted from the light exit side of the backlight source has the same direction and belongs to linearly polarized light, the light that has been refracted by the convex lens structure is still polarized light.

The liquid crystal display provided by embodiments of the present disclosure does not need to use a polarizer to achieve grayscale display, thereby greatly reducing the thickness of the liquid crystal display, decreasing the power consumption of the liquid crystal display, and making the liquid crystal display device lighter, thinner and energy-saving.

As used herein, the term "curvature" is a measure of the degree of unevenness of a geometry, and the reciprocal of the curvature is the radius of curvature. The radius of curvature of an arc is the radius of a circle with the arc being part of the circle. The larger the radius of curvature is, the gentler the arc will be. The smaller the radius of curvature is, the steeper the arc will be. Therefore, the larger the curvature of the convex lens structure is, the smaller the radius of curvature is. The steeper the arc of the convex lens structure is, the greater the refraction of the collimated light will be. The convex lens structure refracts the incident collimated light. Since the curvatures of the convex lens structures are different, the angles of exit light after the collimated light is refracted will be different, thereby realizing grayscale display. Further, since the incident light entering the convex lens structure is collimated polarized light, light exiting after being refracted by the lens structure is still polarized light, so that it is not required to use a polarizer to achieve grayscale display. In embodiments of the present disclosure, grayscale display is achieved by means of the refraction effect of the convex lens structure in the liquid crystal layer. Moreover, the convex structures in embodiments of the present disclosure include, but are not limited to, hemispherical, larger-hemispherical or smaller-hemispherical, and semielliptical structures, which are not specifically limited herein.

The principle of the present disclosure will be described in detail below with reference to specific embodiments. It is to be noted that these embodiments are for better explanation of the present disclosure, but do not limit the present disclosure.

Figure 2:
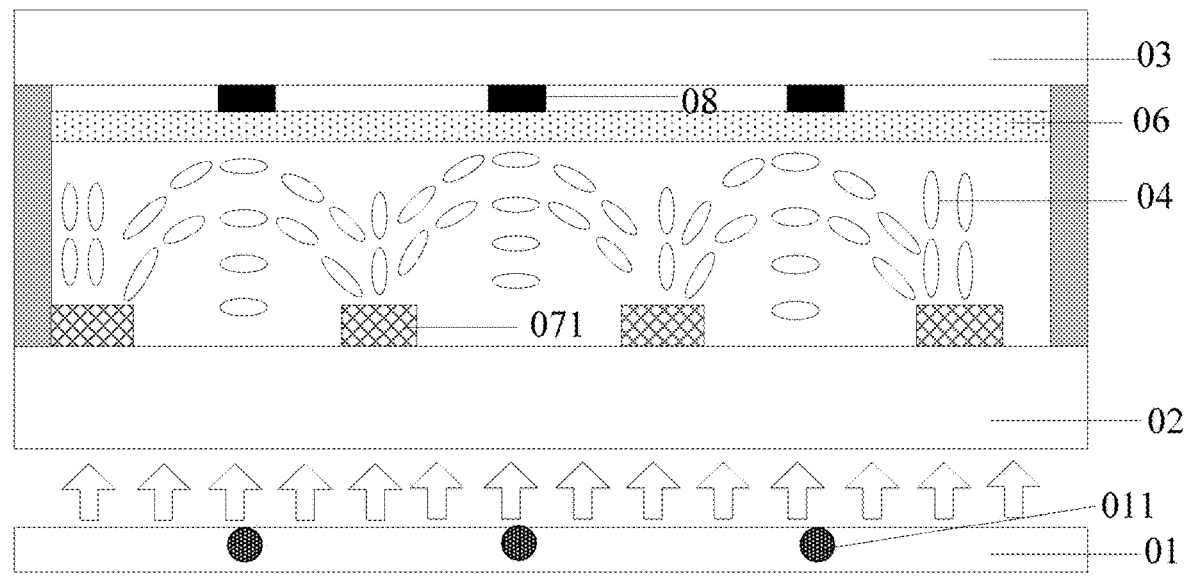
FIG. 2(a) is a schematic diagram of a lens structure in the liquid crystal display provided by embodiments of the present disclosure.
FIG. 2(b) is a schematic diagram of a lens structure in the liquid crystal display provided by embodiments of the present disclosure.
Figure 2:
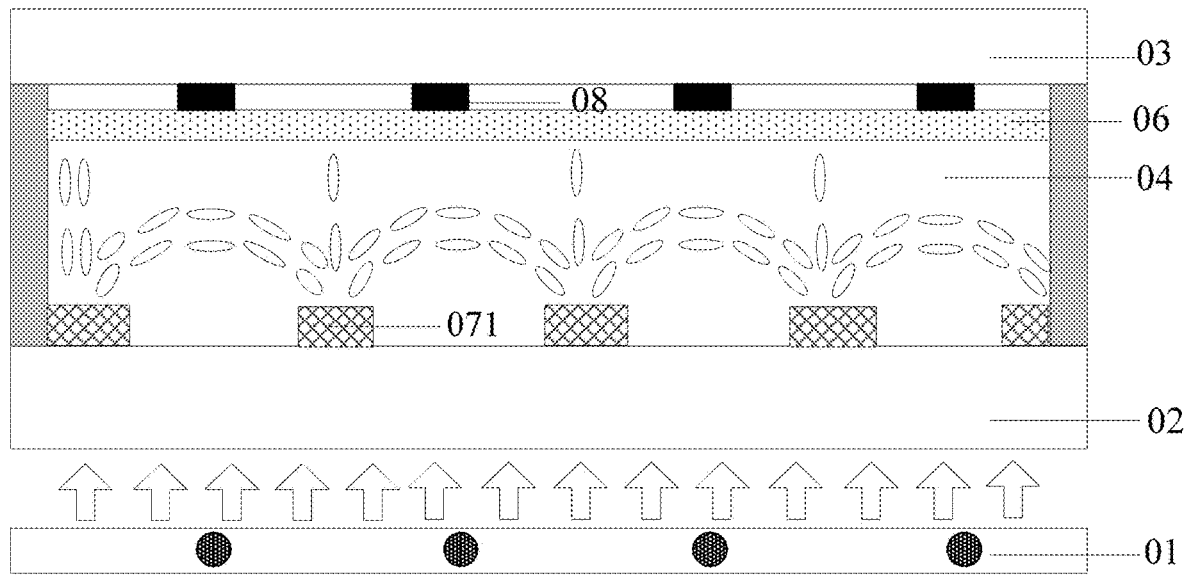

In the above liquid crystal display provided by embodiments of the present disclosure, a grayscale display is achieved by controlling the curvature of the lens structure. The larger the curvature of the lens structure is, the larger the refraction angle of light from the backlight source will be, and the greater the grayscale corresponding to the lens structure is. Specifically, as shown in FIGS. 2(*a*) and 2(*b*), the light shielding structure 08 is disposed between the upper substrate 03 and the first electrode 06, and the curvature of the convex lens structure shown in FIG. 2(*a*) is larger than the curvature of the lens structure shown in FIG. 2(*b*), that is, the curved surface of the lens structure shown in FIG. 2(*a*) is more curved and the curvature thereof is larger. In other words, the thicker the formed lens structure in a cell thickness direction (a direction perpendicular to the upper substrate and/or the lower substrate) is, the larger the curvature will be. If the curvature of the lens structure is larger, light is more refracted, so that the area of the exit light incident on the upper substrate after it is dispersed will be larger. Conversely, the curvature of the lens structure shown in FIG. 2(*b*) is smaller, thus light is less refracted, so that the exit light is dispersed to a lower degree, and the area of light incident on the upper substrate will be smaller. As shown in FIGS. 2(*a*) and 2(*b*), each lens structure corresponds to one sub-pixel for controlling grayscale display of the sub-pixel. Initially, the luminance of the collimated light emitted by the backlight source is the same when it is incident on each lens structure, but the areas of light incident on the upper substrate after being refracted by different lens structures may be different. By means of the refraction of the lens structure, light may be incident on a sub-pixel corresponding to the lens or may be incident on a sub-pixel adjacent to the sub-pixel corresponding to the lens. Therefore, if the exit angle of the exit light after passing through the lens structure is smaller, the area of light incident on the upper substrate will be smaller, and the sub-pixel to which the lens structure corresponds has a smaller grayscale value. Conversely, if the exit angle of the exit light after passing through the lens structure is larger, the area of light incident on the upper substrate will be larger, and the sub-pixel to which the lens structure corresponds has a larger grayscale value.

Figure 3:
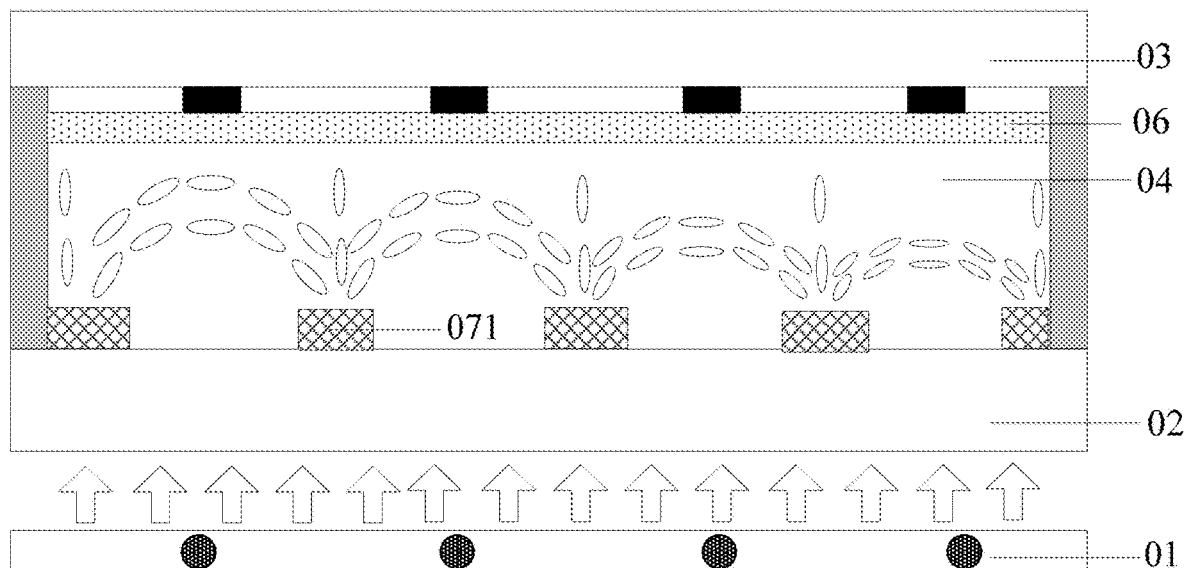
FIG. 3 is a schematic diagram of another lens structure in the liquid crystal display provided by embodiments of the present disclosure.

In the above liquid crystal display provided by embodiments of the present disclosure, the curvature of the lens structure is formed under the iii effect of the electric field between the first electrode and each electrode unit. Therefore, the larger the curvature of the lens structure is, the larger the difference between the voltages applied to the electrode structures corresponding to the liquid crystal molecules that form the lens structure is. Specifically, as shown in FIG. 3, the liquid crystal display comprises a first electrode 06 and electrode units 071. From left to right, the absolute values of the voltage differences between the electrode units 071 and the first electrode are V1, V2, V3 and V4 in sequence, and V1>V2>V3>V4, so that the curvatures of the lens structures sequentially decrease.

In the above liquid crystal display provided by embodiments of the present disclosure, the thicker the equivalent optical path length of each lens structure in the cell thickness direction of the liquid crystal display is, i.e. the larger the curvature of the lens structure is, the larger the effective refractive index of the lens structure will be. Specifically, for each lens structure, the direction of the electric field lines in the thickest portion in the cell thickness direction is parallel to the upper substrate or the lower substrate, and the direction of the electric field lines in the thinnest portion in the cell thickness direction is perpendicular to the upper substrate or the lower substrate.

Figure 4:
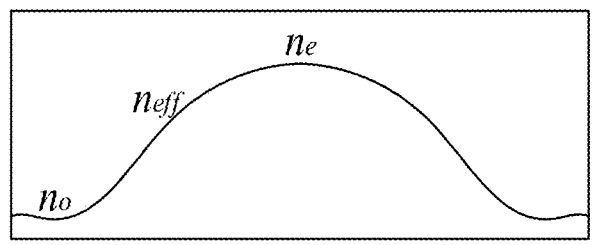
FIG. 4 is a schematic diagram showing a curve of the refractive index of the lens structure provided by embodiments of the present disclosure.

As known to those skilled in the art, liquid crystal is a birefringent material, which has a normal refractive index $n_o$ and an extraordinary refractive index $n_e$, as shown in FIG. 4. When a voltage is applied to the liquid crystal molecules to form a convex lens structure, the lens structure formed by the liquid crystal has an effective refractive index $n_{eff}$. By applying different voltages to the liquid crystal molecules, the effective refractive index $n_{eff}$ of the formed lens structure can vary between the normal refractive index $n_o$ and the extraordinary refractive index $n_e$. By adjusting the effective refractive index $n_{eff}$ of the lens structure, the exit angle of the collimated light after being refracted by the lens structure can be adjusted so as to adjust the ratio of the light shielded by the light shielding structure, thereby adjusting the brightness of the liquid crystal display device.

Figure 5:
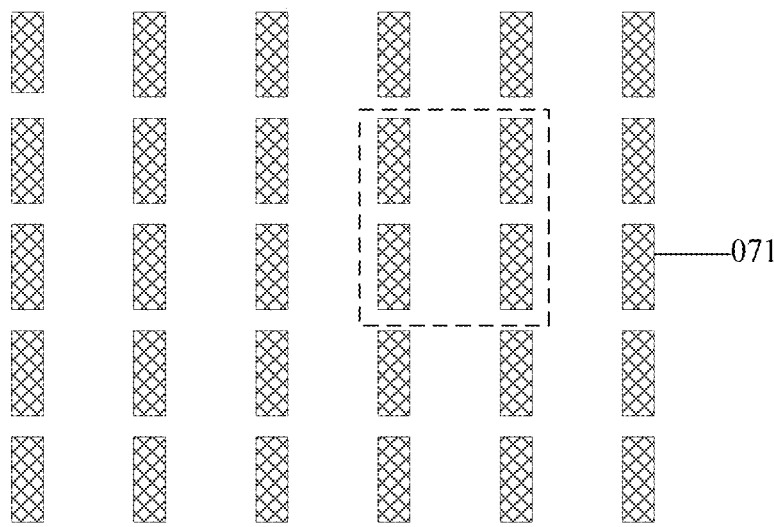
FIG. 5 is a schematic structural diagram of an electrode provided by embodiments of the present disclosure.

In a liquid crystal display provided by another embodiment of the present disclosure, referring to FIG. 5, the electrode units 071 are arranged in an array. It is to be noted that, although each electrode unit in FIG. 5 is exemplified by a block structure, the present disclosure is not limited to the structure shown in FIG. 5, and the electrode units may also have any other shape.

Specifically, the lens structures formed between the first electrode and the electrode units are in one-to-one correspondence with the sub-pixels, that is, each sub-pixel corresponds to one convex lens structure, and grayscale display of the sub-pixels is achieved by making the curvatures of the convex lens structures different. The electrode units are arranged in an array, and the structures of the electrode units may be identical in order to make the projections of the lens structures formed between the first electrode and the electrode units on the lower substrate identical.

In particular, to enable the lens structures formed under the effect of the electric fields between the first electrode and the electrode units to have good refraction effect, in the above liquid crystal display provided by embodiments of the present disclosure, the distance between adjacent electrode units is less than or equal to 3 um. When the distance between the electrode units is sufficiently small, the formed lens structure is small enough so that the formed lens structure has a good refraction effect.

In the above liquid crystal display provided by embodiments of the present disclosure, referring to FIG. 5, each electrode unit is a block electrode. When each electrode unit is of a block structure, the electric field between four adjacent electrode units 071 and the first electrode forms a convex lens structure.

Figure 6:
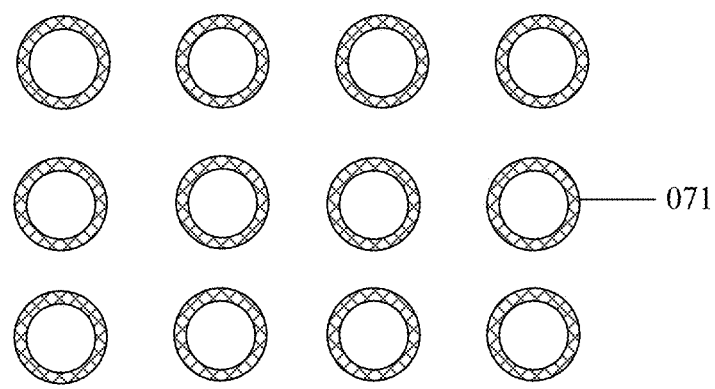
FIG. 6 is a schematic structural diagram of another electrode provided by embodiments of the present disclosure.

Alternatively, as shown in FIG. 6, each electrode unit 071 has an annular structure. Each electrode unit 071 and the first electrode form a convex lens structure. Since the electrode unit 071 has an annular structure, the formed convex lens structure tends to have a spherical structure.

In an exemplary embodiment, when the electrode unit 071 has an annular structure, the lens structure formed by the liquid crystal molecules is of a spherical structure, and the light shielding structure corresponds to the central position of the spherical lens structure. For example, the light shielding structure is a circular pattern. In an exemplary embodiment, the electrode units are set to have an annular structure such that each electrode unit of an annular structure forms an independent spherical lens structure with the first electrode. Each spherical lens structure is in one-to-one correspondence with the sub-pixel. Since the collimated light is polarized light, and after it is refracted by the spherical lens structure, the exit light is still polarized light, it is not required to use a polarizer to achieve grayscale display.

In the above liquid crystal display provided by embodiments of the present disclosure, referring to FIG. 1, the light shielding structure 08 is located between the first electrode 06 and the liquid crystal layer 04. Alternatively, the light shielding structure 08 may also be disposed between the lower substrate 02 and the liquid crystal layer 04. For example, the light shielding structure 08 may also be disposed between the second electrode (electrode units 071) and the lower substrate 02, or disposed between the second electrode (electrode units 071) and the liquid crystal layer 04, which is not limited herein.

Figure 7:
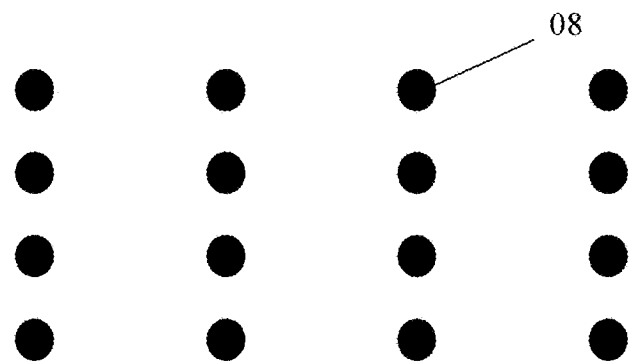
FIG. 7(a) is a schematic structural diagram of a light shielding structure provided by embodiments of the present disclosure.
FIG. 7(b) is a schematic structural diagram of a light shielding structure provided by embodiments of the present disclosure.
Figure 7:
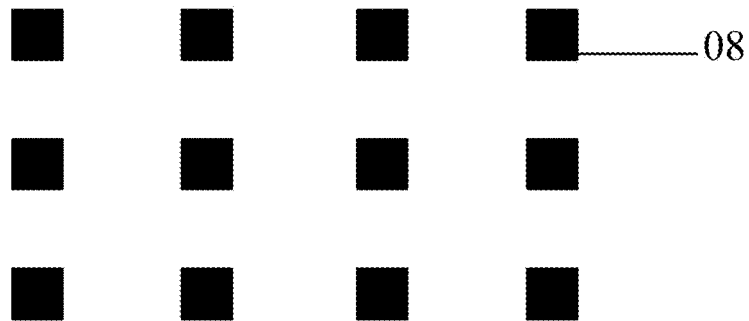

Specifically, as shown in FIG. 7(a), the light shielding structures 08 are circular structures that are in one-to-one correspondence with the light sources of the backlight source. Alternatively, as shown in FIG. 7(b), the light shielding structures 08 are square structures that are in one-to-one correspondence with the light sources of the backlight source.

When the liquid crystal molecules in the liquid crystal display are negative liquid crystals, in an initial state, the long axes of the liquid crystal molecules are parallel to the upper substrate and/or the lower substrate. At that time, a complicated rubbing method is required to change the initial arrangement of the liquid crystal molecules. Alternatively, in the above liquid crystal display provided by embodiments of the present disclosure, referring to FIG. 8, the liquid crystal display further comprises a first alignment film 09 located between the first electrode 06 and the liquid crystal layer 04, and a second alignment film 10 located between the liquid crystal layer 04 and the second electrode (electrode units 071). The first alignment film and the second alignment film are configured to adjust the initial arrangement direction of negative liquid crystals.

In contrast, when the liquid crystal molecules in the liquid crystal display are positive liquid crystals, in an initial state the long axes of the liquid crystal molecules are perpendicular to the upper substrate and/or the lower substrate, thus the liquid crystal display of this structure does not need to be provided with the first alignment film and the second alignment film.

Figure 9:
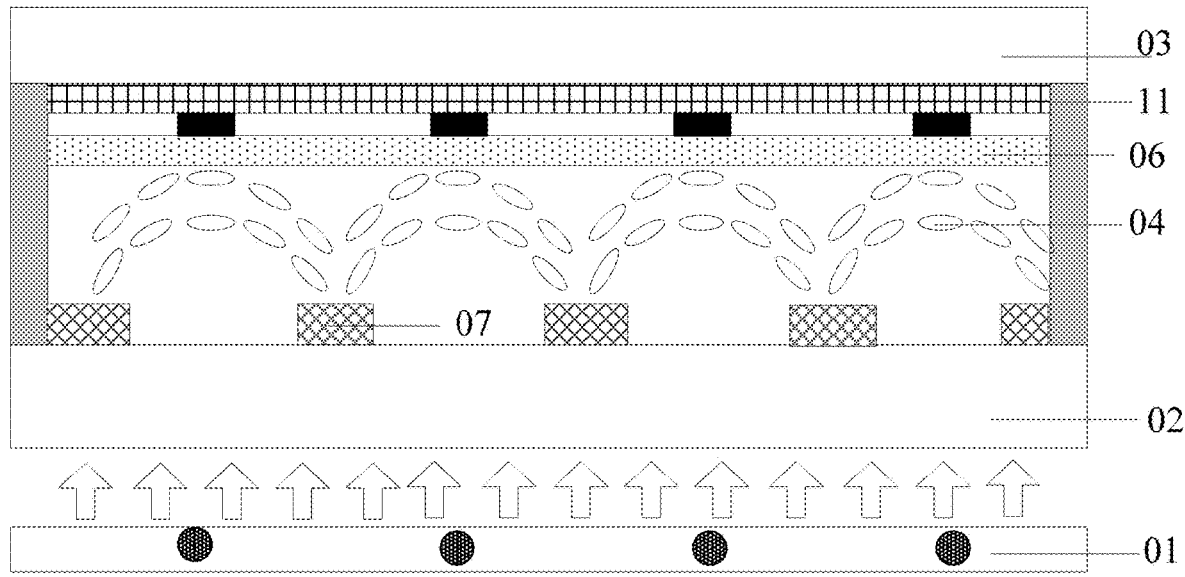
FIG. 9(a) is a schematic structural diagram of a liquid crystal display provided by embodiments of the present disclosure.
FIG. 9(b) is a schematic structural diagram of a liquid crystal display provided by embodiments of the present disclosure.
Figure 9:
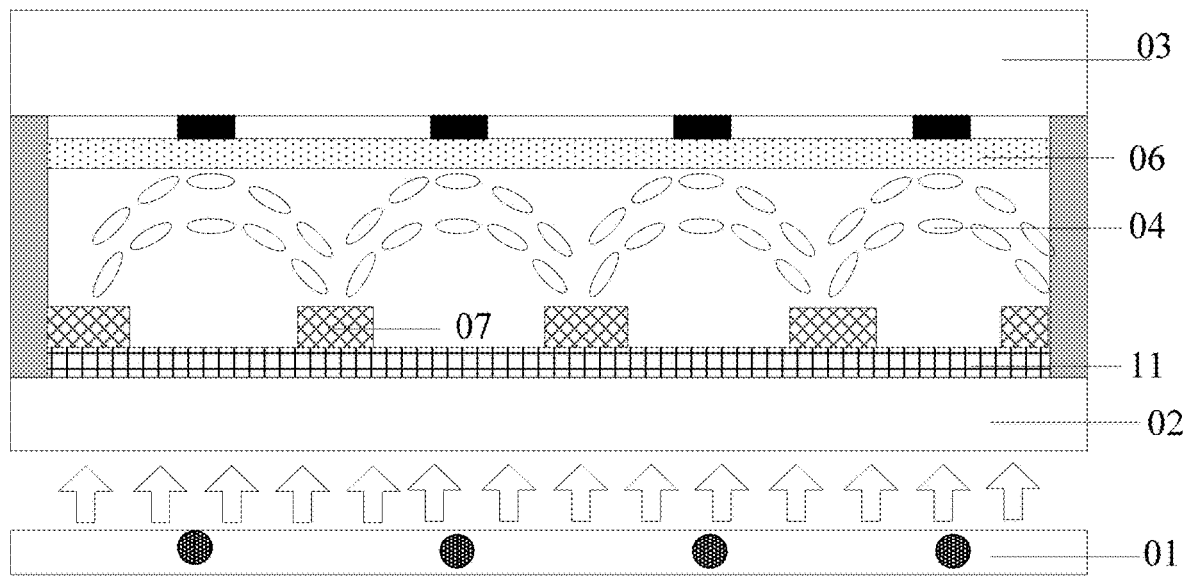

In a liquid crystal display provided by a further embodiment of the present disclosure, in order to realize color display, as shown in FIGS. 9(a) and 9(b), the liquid crystal display further comprises a photochromic conversion layer 11. The photochromic conversion layer 11 is located on a side of the upper substrate 03 facing the first electrode 06, and is configured to convert light transmitted through the liquid crystal layer and in areas corresponding to the lens structures into monochromatic light. Specifically, as shown in FIG. 9(a), the photochromic conversion layer 11 may be disposed between the light shielding structure 08 and the first electrode 06. Alternatively, as shown in FIG. 9(b), the photochromic conversion layer 11 is located on a side of the second electrode (electrode units 071) facing the lower substrate 02, and is configured to convert light emitted by the backlight source and in areas corresponding to the lens structures into monochromatic light. The photochromic conversion layer corresponding to different sub-pixels converts light emitted by the backlight source into light of different colors to realize color display.

Figure 8:
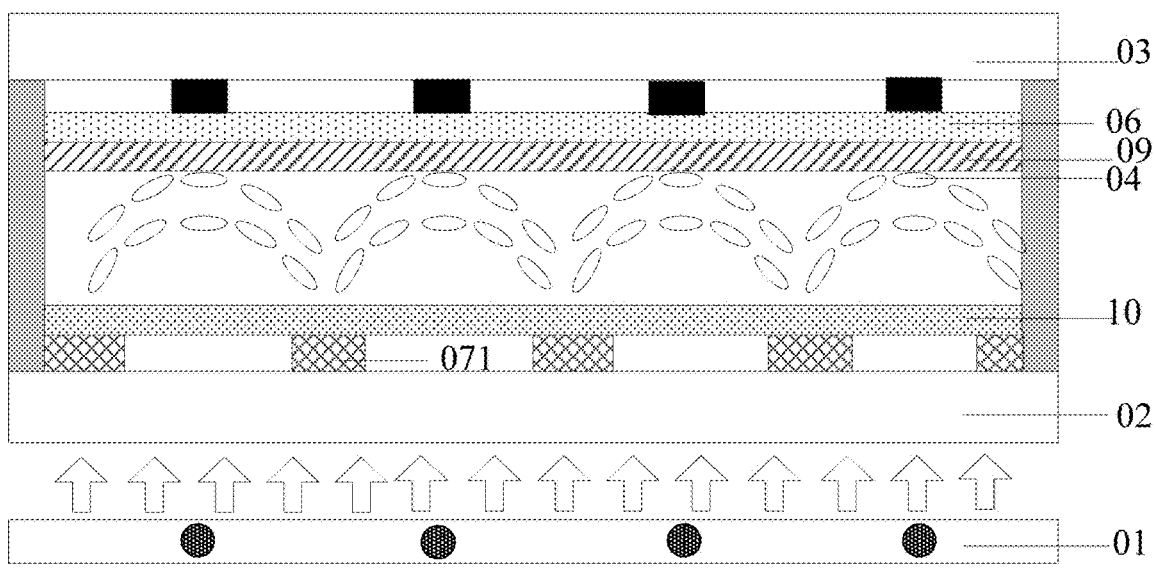
FIG. 8 is a schematic structural diagram of a liquid crystal display provided by embodiments of the present disclosure.
Figure 10:
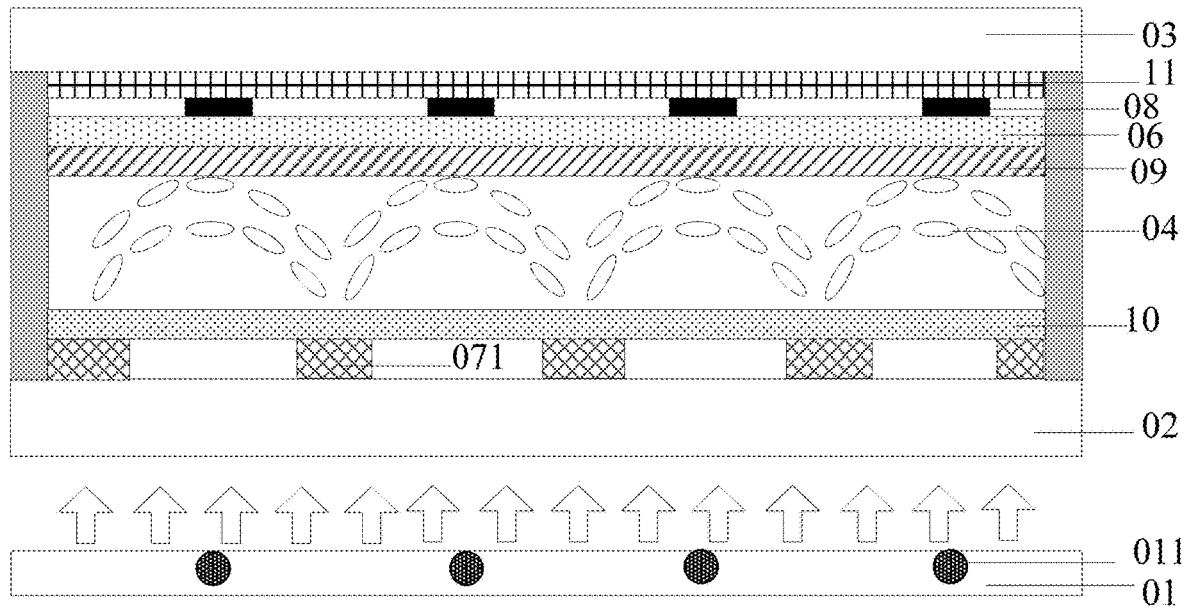
FIG. 10(a) is a schematic structural diagram of a liquid crystal display provided by embodiments of the present disclosure.
FIG. 10(b) is a schematic structural diagram of a liquid crystal display provided by embodiments of the present disclosure.
Figure 10:
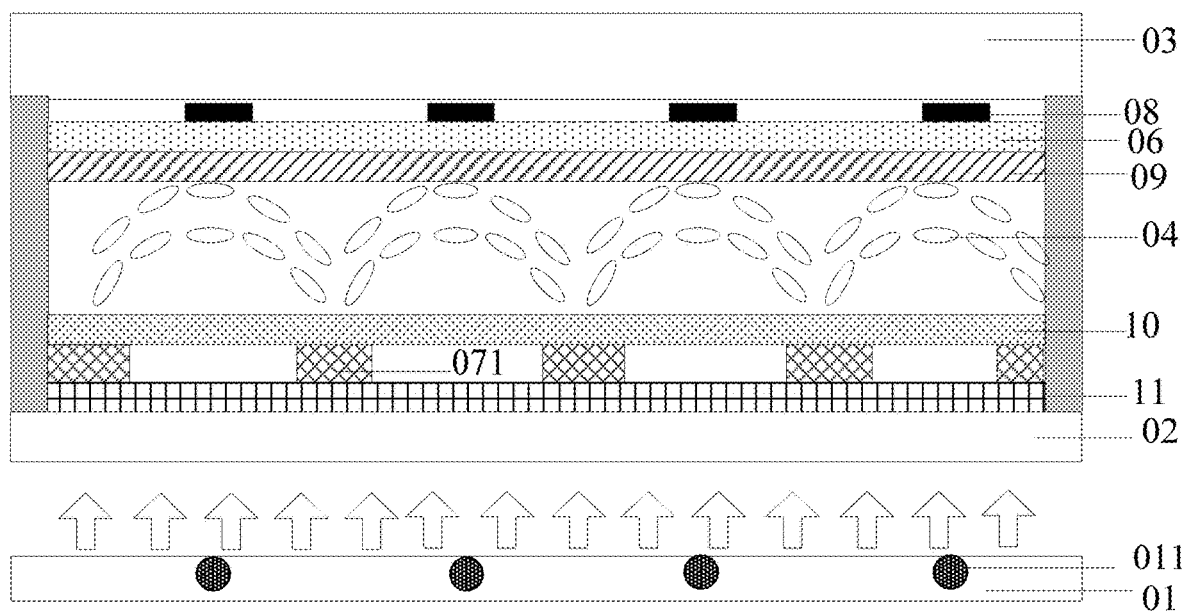

The embodiment shown in FIG. 8 may be combined with the embodiment shown in FIG. 9(a). As shown in FIG. 10(a), the liquid crystal display comprises a first alignment film 09 disposed between the first electrode 06 and the liquid crystal layer 04, a second alignment film 10 disposed between the liquid crystal layer 04 and the second electrode (electrode units 071), and a photochromic conversion layer 11 disposed between the light shielding structure 08 and the upper substrate 03. The embodiment shown in FIG. 8 may also be combined with the embodiment shown in FIG. 9(b). As shown in FIG. 10(b), the liquid crystal display comprises a first alignment film 09 disposed between the first electrode 06 and the liquid crystal layer 04, a second alignment film 10 disposed between the liquid crystal layer 04 and the second electrode (electrode units 071), and an photochromic conversion layer 11 disposed between the second electrode (electrode units 071) and the lower substrate 02. The photochromic conversion layer 11 may also be disposed between any film layers between the liquid crystal layer 04 and the upper substrate 03, or between any film layers between the lower substrate 02 and the liquid crystal layer 04, which is not specifically limited herein. In particular, the light shielding structure 08 and the photochromic conversion layer 11 may also be provided in the same layer.

It is to be noted that, light that has a specific color after passing through the photochromic conversion layer corresponds to one type of sub-pixels in the color liquid crystal display. The liquid crystal display may be an RGB liquid crystal display including red sub-pixels, blue sub-pixels, and green sub-pixels. Of course, the liquid crystal display may also be color liquid crystal displays of other types known to those skilled in the art.

In the liquid crystal display provided by embodiments of the present disclosure, one lens structure corresponds to one sub-pixel, that is, the photochromic conversion layer converts light in an area corresponding to each lens structure into light of one color.

In the above liquid crystal display provided by embodiments of the present disclosure, the photochromic conversion layer 11 includes a light splitting film or a color filter film.

In the liquid crystal display provided by embodiments of the present disclosure, any of the electrodes may be a transparent electrode. In particular, the first electrode and the electrode units in the second electrode are all transparent electrodes, so that these electrodes are prevented from shielding light. Materials of the electrodes may include indium tin oxide and other materials, which is not specifically limited herein.

It is to be noted that, although embodiments of the present disclosure have been described above based on an example in which the first electrode is a planar electrode and the second electrode includes a plurality of electrode units, in an alternative embodiment, the first electrode may include a plurality of electrode units and the second electrode may be a planar electrode.

Based on the same inventive concept, embodiments of the present disclosure further provide a method for driving the liquid crystal display according to any one of the foregoing embodiments. The method comprises: receiving a to-be-displayed image signal; adjusting a voltage provided to the first electrode and the second electrode according to a to-be-displayed grayscale value of each sub-pixel in the to-be-displayed image signal, so as to control the curvature of the convex lens structure.

To sum up, for the liquid crystal display and the driving method thereof provided by embodiments of the present disclosure, upon display, the first electrode and the electrode units are configured to control the liquid crystal molecules in corresponding areas in the liquid crystal layer to be deflected to form a convex lens structure, and the control unit is configured to adjust a voltage difference between the first electrode and each electrode unit so as to control the curvature of the formed lens structure. Therefore, a convex lens structure is formed in the liquid crystal layer under the effect of the voltage difference between the first electrode and each electrode unit. By means of the refraction effect of the convex lens structures, the collimated light emitted from the light exit side of the backlight source is refracted to different degrees, thereby achieving grayscale display. The collimated light emitted from the light exit side of the backlight source has the same direction, and light after being refracted by the convex lens structure is still polarized light. It can be seen that the liquid crystal display provided by embodiments of the present disclosure does not need to use a polarizer to achieve grayscale display, thereby greatly reducing the thickness of the liquid crystal display, decreasing the power consumption of the liquid crystal display, and making the liquid crystal display device lighter, thinner and energy-saving.

It will be apparent to those skilled in the art that various modifications and variations can be made in the present disclosure without departing from the spirit and scope thereof. Thus, if these modifications and variations of the present disclosure fall within the scope of the claims of the present disclosure and their equivalent technologies, the present disclosure is also intended to include these modifications and variations.

The invention claimed is:

1. A liquid crystal display comprising:
a backlight source, including a plurality of light sources;
a lower substrate on a light exit side of the backlight source;

an upper substrate disposed opposite to the lower substrate;

a liquid crystal layer between the upper substrate and the lower substrate;

a first electrode on a side of the upper substrate facing the liquid crystal layer and a second electrode on a side of the lower substrate facing the liquid crystal layer; and light shielding structures in one-to-one correspondence with the plurality of light sources, orthographic projections of each of the light shielding structures and a corresponding light source on the lower substrate overlapping, wherein, light emitted from each of the light sources is incident into the liquid crystal layer in a collimated manner, the first electrode and the second electrode are configured to form an electric field in response to voltages applied to the first electrode and the second electrode, so that liquid crystal molecules within an area of the electric field are deflected to form a convex lens structure, and the larger an equivalent optical path length of the lens structure in a cell thickness direction of the liquid crystal display is the larger an effective refractive index of the lens structure will be.

2. The liquid crystal display according to claim 1, wherein the larger the curvature of the lens structure is, the larger an exit angle of light exiting from the lens structure will be.

3. The liquid crystal display according to claim 1, wherein the larger the voltage difference between the first electrode and the second electrode is, the larger the curvature of the lens structure will be.

4. The liquid crystal display according to claim 1, wherein the light shielding structures are located between the first electrode and the upper substrate.

5. The liquid crystal display according to claim 4, further comprising:

a first alignment film between the light shielding structures and the liquid crystal layer; and a second alignment film between the liquid crystal layer and the second electrode.

6. The liquid crystal display according to claim 1, further comprising a photochromic conversion layer, wherein the photochromic conversion layer is located on a side of the upper substrate facing the first electrode, and is configured to convert light transmitted through the liquid crystal layer and corresponding to the lens structure into monochromatic light.

7. The liquid crystal display according to claim 6, wherein the photochromic conversion layer includes one of a light splitting film and a color filter film.

8. The liquid crystal display according to claim 1, further comprising a photochromic conversion layer, wherein the photochromic conversion layer is located on a side of the lower substrate facing the second electrode, and is configured to convert light emitted by the backlight source and corresponding to the lens structure into monochromatic light.

9. A liquid crystal display comprising:

a backlight source, including a plurality of light sources, a lower substrate on a light exit side of the backlight source;

an upper substrate disposed opposite to the lower substrate;

a liquid crystal layer between the upper substrate and the lower substrate;

a first electrode on a side of the upper substrate facing the liquid crystal layer and a second electrode on a side of the lower substrate facing the liquid crystal layer; and light shielding structures in one-to-one correspondence with the plurality of light sources, orthographic projections of each of the light shielding structures and a corresponding light source on the lower substrate overlapping, wherein, light emitted from each of the light sources is incident into the liquid crystal layer in a collimated manner, the first electrode and the second electrode are configured to form an electric field in response to voltages applied to the first electrode and the second electrode, so that liquid crystal molecules within an area of the electric field are deflected to form a convex lens structure, and the liquid crystal display comprises a plurality of sub-pixels arranged in an array, the plurality of sub-pixels are in one-to-one correspondence with lens structures, and the lens structures are in one-to-one correspondence with the plurality of light sources.

10. The liquid crystal display according to claim 9, wherein the first electrode is a planar electrode, and the second electrode includes a plurality of electrode units.

11. The liquid crystal display according to claim 10, wherein the electrode units are arranged in an array.

12. The liquid crystal display according to claim 11, wherein a distance between adjacent electrode units is less than or equal to 3 um.

13. The liquid crystal display according to claim 11, wherein each electrode unit is a block electrode.

14. The liquid crystal display according to claim 11, wherein each electrode unit is of an annular structure.

15. The liquid crystal display according to claim 14, wherein each lens structure is a spherical structure, and a light shielding structure is aligned with a central position of a corresponding spherical structure.

16. The liquid crystal display according to claim 15, wherein each light shielding structure is a circular structure.

17. The liquid crystal display according to claim 9, wherein the second electrode is a planar electrode, and the first electrode includes a plurality of electrode units.

18. A method for driving a liquid crystal display, the liquid crystal display comprising:

a backlight source, including a plurality of light sources, a lower substrate on a light exit side of the backlight source;

an upper substrate disposed opposite to the lower substrate;

a liquid crystal layer between the upper substrate and the lower substrate;

a first electrode on a side of the upper substrate facing the liquid crystal layer and a second electrode on a side of the lower substrate facing the liquid crystal layer; and light shielding structures in one-to-one correspondence with the plurality of light sources, orthographic projections of each of the light shielding structures and a corresponding light source on the lower substrate overlapping, wherein, light emitted from each of the light sources is incident into the liquid crystal layer in a collimated manner, the first electrode and the second electrode are configured to form an electric field in response to voltages applied to the first electrode and the second electrode, so that liquid crystal molecules within an area of the electric field are deflected to form a convex lens structure, the method comprising:

receiving a to-be-displayed image signal;

controlling voltages applied to the first electrode and the second electrode according to a to-be-displayed gray-scale value of each sub-pixel in the to-be-displayed image signal, so as to control the curvature of the convex lens structure.

* * * * *